US 8,437,051 B2

(12) United States Patent
Nakamichi

(10) Patent No.: US 8,437,051 B2
(45) Date of Patent: May 7, 2013

(54) SHEET FINISHER, IMAGE FORMING APPARATUS AND IMAGE FORMING SYSTEM

(75) Inventor: Motoki Nakamichi, Hachioji (JP)

(73) Assignee: Konica Minolta Business Technologies, Tokyo (JP)

( * ) Notice: Subject to any disclaimer, the term of this patent is extended or adjusted under 35 U.S.C. 154(b) by 476 days.

(21) Appl. No.: 12/758,186

(22) Filed: Apr. 12, 2010

(65) Prior Publication Data
US 2010/0271672 A1 Oct. 28, 2010

(30) Foreign Application Priority Data
Apr. 22, 2009 (JP) .................................. 2009-103638

(51) Int. Cl.
*H04N 1/04* (2006.01)

(52) U.S. Cl.
USPC ............. 358/498; 358/497; 358/474; 399/82; 270/58.08

(58) Field of Classification Search .................. 358/498, 358/497, 496; 399/410, 82, 85, 87; 270/58.08, 270/21.1, 32, 37, 45
See application file for complete search history.

(56) References Cited

U.S. PATENT DOCUMENTS

| | | | | |
|---|---|---|---|---|
| 5,346,195 A | * | 9/1994 | Heimann et al. | 270/52.01 |
| 5,447,297 A | * | 9/1995 | Murata et al. | 270/58.09 |
| 6,119,680 A | * | 9/2000 | Barritt | 126/299 D |
| 6,430,382 B1 | * | 8/2002 | Okamoto et al. | 399/82 |
| 7,524,155 B2 | * | 4/2009 | Hata et al. | 412/19 |
| 7,542,059 B2 | * | 6/2009 | Rizzolo et al. | 347/117 |
| 7,567,360 B2 | * | 7/2009 | Takahashi et al. | 358/1.15 |
| 7,651,092 B2 | * | 1/2010 | Hirao et al. | 271/298 |
| 7,815,179 B2 | * | 10/2010 | Taguchi et al. | 270/52.17 |
| 8,054,494 B2 | * | 11/2011 | Takahashi et al. | 358/1.15 |
| 8,107,105 B2 | * | 1/2012 | Sakai | 358/1.14 |
| 8,169,627 B2 | * | 5/2012 | Kudo et al. | 358/1.13 |
| 2008/0231888 A1 | * | 9/2008 | Kuwano | 358/1.15 |
| 2008/0259389 A1 | * | 10/2008 | Takahashi | 358/1.15 |
| 2009/0102112 A1 | * | 4/2009 | Taguchi et al. | 270/58.07 |

FOREIGN PATENT DOCUMENTS

| | | |
|---|---|---|
| JP | 62-216776 A | 9/1987 |
| JP | 2003-110806 A | 4/2003 |
| JP | 2007-97083 A | 4/2007 |

OTHER PUBLICATIONS

Japanese Office Action dated Oct. 9, 2012 (and English translation thereof) in counterpart Japanese Application No. 2009-103638.

* cited by examiner

*Primary Examiner* — Negussie Worku
(74) *Attorney, Agent, or Firm* — Holtz, Holtz, Goodman & Chick, P.C.

(57) ABSTRACT

A sheet finisher includes: a conveyance section to convey a sheet; an image reading section which reads an image of a sheet; and a sheet finisher control section, wherein the sheet finisher control section transmits wait information which requests an interruption of sheet conveyance, to outside, and transmits image data acquired by reading of the image reading section to the outside after transmitting the wait information.

13 Claims, 8 Drawing Sheets

SHEET FINISHER, IMAGE FORMING APPARATUS AND IMAGE FORMING SYSTEM

RELATED APPLICATION

This application is based on Japanese Patent Application NO. 2009-103638 filed on Apr. 22, 2009 in Japanese Patent Office, the entire content of which is hereby incorporates by references.

BACKGROUND OF THE INVENTION

1. Field of Technology

The present invention relates to a sheet finisher to be connected to an image forming apparatus, an image forming apparatus to which the sheet finisher is connected and an image forming system to which the image forming apparatus and the sheet finisher are connected. In particular, the invention relates to those each being one wherein an image-reading section is provided on the sheet finisher.

2. Description of Related Art

The sheet finisher having therein an image-reading section is proposed in each of official reports of Unexamined Japanese Patent Application Publication No. 2003-110806 and Unexamined Japanese Patent Application Publication No. 2007-97083.

In the image forming system described in Unexamined Japanese Patent Application Publication No. 2003-110806, image data which are acquired through reading by an image-reading section provided on the sheet finisher are used for correction of image forming conditions in image forming that is practiced by an image forming apparatus, and an image is formed by the image forming apparatus based on the image data acquired by reading by the image-reading section.

In the technology in Unexamined Japanese Patent Application Publication No. 2007-97083, timing control for controlling timing scanning control representing image-reading control and sheet finishing control is carried out for conducting image-reading effectively in the sheet finisher.

As is described in Unexamined Japanese Patent Application Publication No. 2003-110806 and Unexamined Japanese Patent Application Publication No. 2007-97083, image data generated through image-reading by the image reading section in the sheet finisher are transmitted to the image forming apparatus, to be used in the image forming apparatus.

The image forming apparatus and the sheet finisher are connected by an ordinary communication device, and transmission and reception of control data are carried out through the communication device, and when image data are transmitted or received by the aforesaid communication device, following problems are caused.

An amount of data of image data is remarkably large when it is compared with an amount of data of control data for sheet finishing. For this reason, communication for image data takes a long time, and if communication of image data is conducted in a job, communication of control data and communication of image data conflict with each other, and there is sometimes an occasion that results in inability to operate and in suspension of the system.

In Unexamined Japanese Patent Application Publication No. 2007-97083, image reading is made to be more effective through timing control for image-reading control (scanning control) in the sheet finisher and in sheet finishing control. However, in Unexamined Japanese Patent Application Publication No. 2007-97083, a period of time for transmission of image data is not considered at all. Therefore, when practicing the timing control mentioned in Unexamined Japanese Patent Application Publication No. 2007-97083, there is caused sometimes an occasion wherein the system does not work normally because of the causes which were explained earlier.

For the communication of control data for sheet finishing, there has been used communication wire employing a communication cable has been used. However, the aforesaid difficulties cannot be avoided in the communication system that is designed for the control of this kind. In this case, utilization of a high speed communication device capable of dealing with image data is considered, which, however has a problem of cost increase. Further, when adding an image-reading function to the image system by using an existing image forming system, it is necessary to provide a high speed communication device in addition to the image reading section, which results in a large increase in cost.

SUMMARY OF THE INVENTION

One aspect of the present invention is to provide a sheet finisher comprising a conveyance section which conveys a sheet; an image reading section which reads an image of a sheet; and a sheet finisher control section which transmits wait information to request an interruption of sheet conveyance, to outside, and transmits image data acquired by reading of the image reading section to the outside after transmitting the wait information.

Another aspect of the present invention is to provide an image forming apparatus comprising: an image forming section which forms an image on a sheet; a sheet feeding section which feeds a sheet to the image forming section; and an image forming apparatus control section, wherein, when the image forming apparatus control section receives image data from a sheet finisher, the image forming apparatus control section interrupts the sheet feeding section, then receives the image data, and then restarts the feeding sheet by activating the sheet feeding section after completing the reception of the image data.

And further another aspect of the present invention is to provide an image farming system comprising: an image forming apparatus including an image forming section which forms image on a sheet; and a sheet feeding section which feeds a sheet to the image forming section; and a sheet finisher including a conveyance section which conveys a sheet, and an image reading section which reads an image of the sheet at the conveyance section; and a control section, wherein, when the control section transmits the image forming apparatus image data which the image reading section generates by reading an image from the sheet finisher to the image forming apparatus, the control section interrupts conveying the sheet from the image forming apparatus to the sheet finisher, then transmits the image data after interrupting conveying sheet, and then starts conveying sheet from the image forming apparatus to the sheet finisher after completing transmitting the image data.

DESCRIPTION OF THE PREFERRED EMBODIMENT

Figure 1:
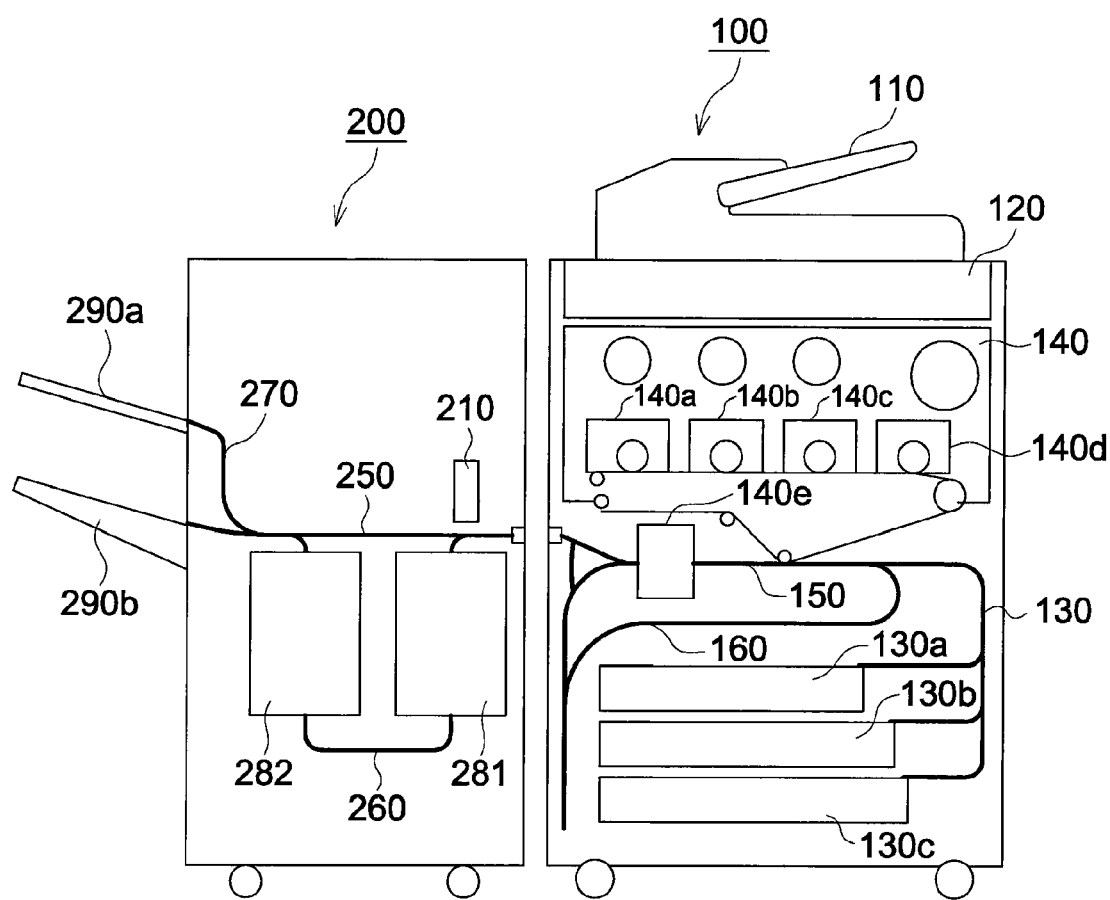
FIG. 1 is a diagram showing the whole of an image forming system equipped with a sheet finisher and an image forming apparatus relating to the embodiment of the invention.

Referring to the drawings, the invention will be explained as follows, based on an embodiment of the invention to which, however, the invention is not limited.

FIG. 1 is a diagram showing the whole of an image forming system that is equipped with a sheet finisher relating to the embodiment of the invention and with an image forming apparatus of the invention.

In FIG. 1, the numeral 100 represents an image forming apparatus that forms an image on a sheet based on image data, and 200 represents a sheet finisher that carries on punching processing or folding processing for a sheet ejected from the image forming apparatus 100.

Incidentally, as a sheet finisher, it is possible to connect to the image forming apparatus 100 an object that conducts one or more of optional sheet finishing such as, for example, stapling sheet finishing, shifting sheet finishing or cutting sheet finishing, other than the punching processing and the folding processing.

Further, it is also possible to connect a plurality of sheet finishers to the image forming apparatus 100, in place of only one sheet finisher. As the plural sheet finishers of this kind, there are given those composed, for example, of a sheet finisher composed of a relay conveyance unit that brings a sheet ejected from the image forming apparatus 100 to a sheet finisher on the following step and of a sheet finisher that conducts at least one of various types of sheet finishing processes described earlier.

The image forming apparatus 100 has therein document conveyance device 110, document-reading section 120, sheet feeding section 130, image forming section 140, first conveyance section 150 that forms a conveyance path through which a sheet passes the image forming section 140 and second conveyance section 160 wherein the sheet having on its one side an image is reversed inside out and is fed again to the image forming section 140. The image forming section 140 is one to form an image through electrophotographic process, and it has four image forming units 140a, 140b, 140c and 140d for forming respectively a yellow image, a magenta image, a cyan image and a black image and has fixing device 140e and it can form a color image. The sheet feeding section 130 has three sheet feeding trays 130a, 130b and 130c.

The sheet finisher 200 has therein image-reading section 210, punching section 281, first sheet ejection section 290a and second sheet ejection section 290b.

As conveyance sections for sending sheets to the aforesaid respective sections in the sheet finisher 200 and for causing them to pass through, there are provided first conveyance section 250, second conveyance section 260 and third conveyance section 270.

The first conveyance section 250 conveys a sheet that is ejected from the image forming apparatus 100 to eject it to first sheet ejection section 290a or to second sheet ejection section 290b. The second conveyance section 260 causes a sheet ejected from the image forming apparatus 100 to pass through punching section 281 and folding section 250, and then, sends it to the first conveyance section 250. The third conveyance section 270 conveys a sheet to the first sheet ejection section 290a from the first conveyance section 250.

The image-reading section 210 is provided at a sheet carry-in section on the sheet finisher 200, and it scans an image on the sheet that is fed into the sheet finisher 200 from the image forming apparatus 100 to the sheet finisher 200 to read it to generate image data.

The first sheet ejection section 290a is used when sheets in a small number of sheets are ejected without sheet finishing, while sheets in a large number of sheets and sheet-finished sheets are ejected to the second sheet ejection section 290b. The second sheet ejection section 290b is composed of a sheet ejection tray that goes up and down, and when an amount of stacked sheets is increased, the sheet ejection tray goes down gradually so that an upper surface of the stacked sheets is maintained to be at a fixed level constantly.

Figure 2:
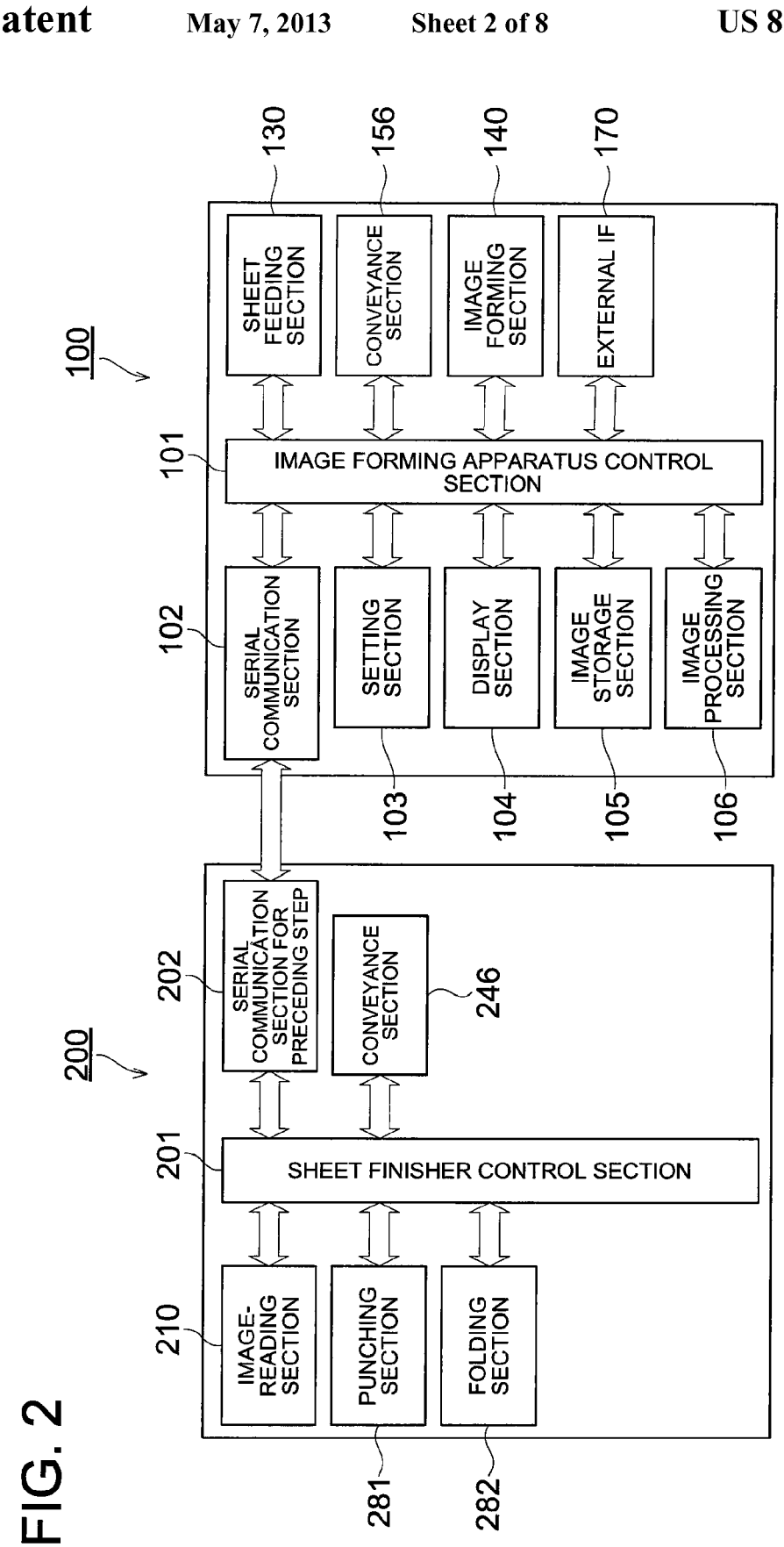
FIG. 2 is a block diagram of a control system of an image forming system shown in FIG. 1.

FIG. 2 is a block diagram of a control system of an image forming system shown in FIG. 1.

The image forming apparatus 100 has therein image forming apparatus control section 101 representing a primary control device that controls the whole of the image forming apparatus 100 and the image forming system, serial communication section 102 representing an image forming apparatus communication section 102 that conducts serial communication through the sheet finisher 200 and a communication cable described later, setting section 103 that sets various conditions in a job such as various processes in the sheet finisher, display section 104 that conducts various types of conditions in a job such as various types of processes in the sheet finisher, image storage section 105 that stores image data, image processing section 106 that conducts various types image processes for image data, sheet feeding section 130 that supplies a sheet to image forming section 140, image forming section 140, conveyance section 156 and external IF 170 that conducts communication with the outside such as receiving image data from outside computers. The conveyance section 156 includes first conveyance section 150 and second conveyance section 160.

The sheet finisher 200 has therein sheet finisher control section 201 that controls sheet finisher 200, serial communication section for preceding step 202 representing a sheet finisher communication section that conducts serial communication through image forming apparatus 100 and a communication cable, image-reading section 210 that reads an image on a sheet conveyed in the sheet finisher 200 and generates image data, conveyance section 246, punching section 281 and folding section 282.

Communication in the image forming system is carried out between adjoining apparatuses. Therefore, in the image forming system wherein plural sheet finishers are connected to the image forming apparatus 100, communication between the image forming apparatus 100 and a terminal sheet finisher is carried out through an intermediate sheet finisher. Serial communication section for preceding step 202 conducts communication. With serial communication section 102 of image forming apparatus 100 that is connected with the preceding step.

Conveyance section 246 includes first conveyance section 250, second conveyance section 260 and third conveyance section 270 all shown in FIG. 1.

In the image forming section 140, an image is formed on a sheet that is fed out from sheet feeding section 130, and the sheet on which an image is formed is ejected to sheet finisher 200.

In the sheet finisher 200, the sheet that has been subjected to punching processing or folding processing is ejected to second ejection section 290b.

Even in image forming with no sheet finishing, sheets are ejected to the second sheet ejection section 290b, in the case of forming a large number of images. The second sheet ejection section 290b has a function to go up and down, and when sheets on the second sheet ejection section are increased, the second sheet ejection section 290b goes down automatically, thereby, a top face of the stacked sheets is maintained to be at the fixed height.

In the case of forming images in a small amount without sheet finishing, sheets are ejected to the first sheet ejection section 290a.

Image reading by image-reading section 210 is conducted for image quality adjustment, for example, for images formed in image forming apparatus 100.

When temperatures and humidity are changed for each lapse of a certain period of time for a prescribed number of sheets in continuous image forming, image quality adjustment for correcting fluctuations of image quality is carried out, in the case of maintenance. The image quality adjustment is conducted by a widely known method, for example, by the following method.

A sheet on which an image has been formed by the use of image data of test patterns stored in image storage section 105 is sent to the sheet finisher 200. In the sheet finisher 200, the image-reading section 210 reads out test patterns which are formed, and generates image data. Image data of test patterns are transmitted to image forming apparatus 100 by serial communication section 102 and by serial communication section for preceding step 202, and image processing section 106 of the image forming apparatus 100 conducts image analyses for the image data to prepare information of image quality evaluation including gradient and color tone.

Based on information of the image evaluation, there is carried out image quality adjustment for correcting image forming conditions.

For this image evaluation, the image-reading section 210 provided on the sheet finisher 200 reads out an image formed in the image forming apparatus 100, and image data acquired through the reading out are used.

When conducting this image quality adjustment, it is necessary to transmit image data to the image forming apparatus 100 from the sheet finisher 200, and when transmitting image data in the course of practicing an image forming process, an amount of data is extremely large in comparison with an amount of data for control data, which is a problem for system control.

Figure 3:
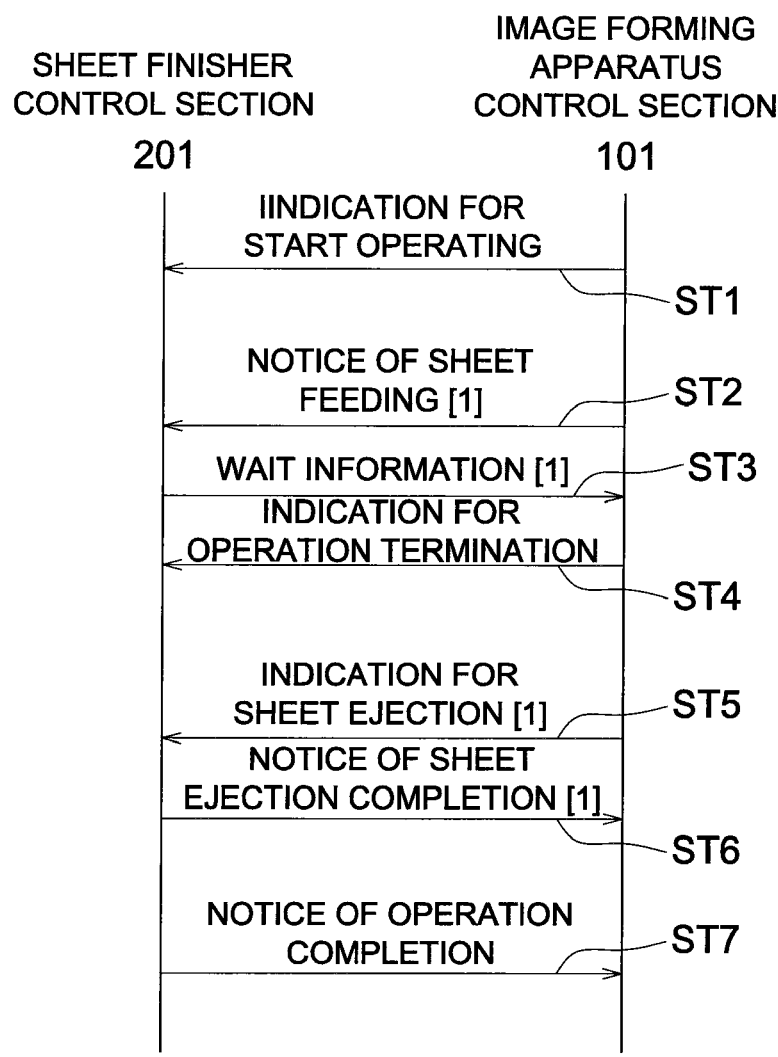
FIG. 3 is a ladder diagram showing communication in an ordinary image forming process.
Figure 4:
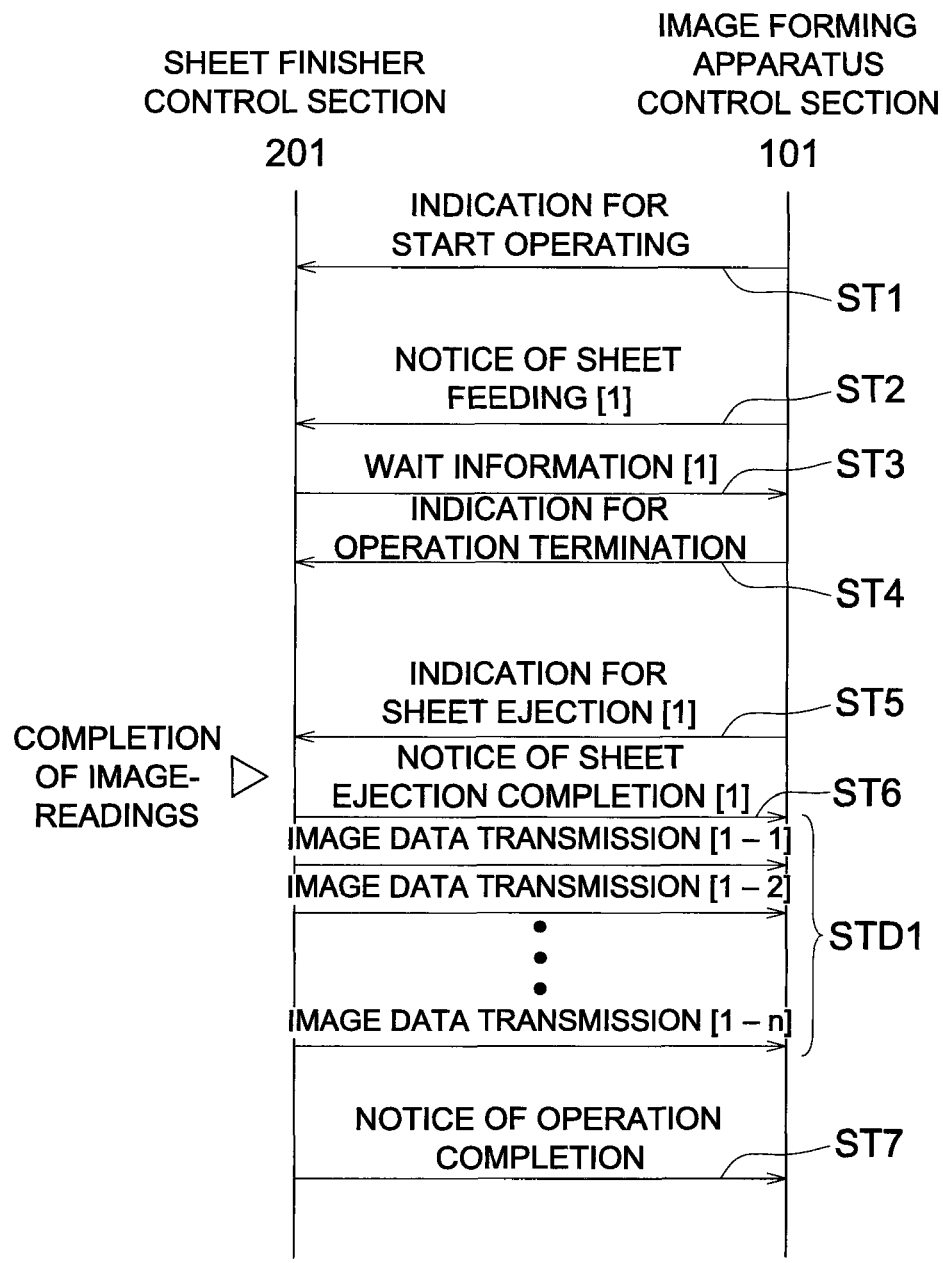
FIG. 4 is a ladder diagram in the case of transmitting image data generated through image-reading to image forming apparatus 100.

Next, this problem will be explained. Communication between image forming apparatus control section 101 in the image forming process and sheet finisher control section 201 will be explained as follows, referring to FIGS. 3 and 4, first. Each of FIGS. 3 and 4 is a ladder diagram showing communication between image forming apparatus control section 101 and sheet finisher control section 201. Incidentally, each of FIGS. 3 and 4 shows an example of a job to send a sheet to sheet finisher 200 from image forming apparatus 100 to complete.

FIG. 3 shows communication in an ordinary image forming process, namely, communication in image forming process wherein image reading is not carried out in image reading section 210 of sheet finisher 200.

In step ST1, an indication to start image forming operations is sent to sheet finisher control section 201 from image forming apparatus control section 101. In the sheet finisher 200, control of starting for conveyance section 246 is conducted, corresponding to the aforesaid indication.

In step ST2, a start of sheet feeding for starting sheet feeding is noticed to sheet finisher control section 201 from image forming apparatus control section 101. In this notice of the start of sheet feeding, there are included information of processing modes in sheet finisher 200, such as processing contents like punching and folding, for example, and sheet sizes. A numerical value in brackets shows an ordinal number of the sheet. Since a sheet in the drawing is a first sheet, it is indicated to be [1].

In step ST3, wait information is noticed to image forming apparatus control section 101 from sheet finisher control section 201. In the sheet finisher 200, there is sometimes an occasion wherein a considerable period of time is required for setting of the initial state. For example, a considerable period of time is required for setting of the punching position, for setting of stapling position and for switching between conveyance paths. A period of time for setting of the state of this kind is calculated by sheet finisher control section 201, and wait time is noticed.

In step ST4 of the stage when jobs for sheet feeding, image forming, sheet ejection and sheet finishing have been completed, a termination of operations is indicated from image forming apparatus control section 101 to sheet finisher control section 201.

In step ST5, sheet ejection indication for indicating ejection of the final sheet is carried out from image forming apparatus control section 101 to sheet finisher control section 201. The sheet ejection indication in step ST5 is carried out by a sheet ejection sensor provided on a sheet ejection section of image forming apparatus 100 based on sheet ejection detection signal from image forming apparatus control section 101 to sheet finisher control section 201. The sheet finisher 200 ejects a sheet following this indication, and in step ST6, completion of sheet ejection is noticed from sheet finisher control section 201 to image forming apparatus control section 101, and in step ST7, completion of operations of the sheet finisher is noticed to image forming apparatus control section 101, thus, a job is completed.

FIG. 4 is a ladder diagram in the case of an occasion where image reading is conducted by image reading section 210 in sheet finisher 200, and image data generated through the image-reading are transmitted to image forming apparatus 100.

Steps from step ST1 up to step ST6 in FIG. 4 are the same as those in FIG. 3.

The sheet finisher 200 sends image data to image forming apparatus 100 after completion of sheet ejection. An amount of image data is markedly large, as compared with data for the control. For example, an amount of image data is in the double-digits or more of an amount for control in a unit of a byte. Since an amount of the data is large like this, the image data are divided into plural portions, like 1-1, 1-2, ... 1-n, to be transmitted. Meanwhile, image reading by image reading section 210 is carried out at the moment after the indication for sheet ejection in step ST5.

At the stage when data transmission in step STD1 is terminated, a termination of operations of the sheet finisher 200 is notified to image forming apparatus control section 101, to be terminated (ST7).

An example shown in FIG. 4 is a job to finish a sheet as stated above. In this case, there is no conflict between communication relating to sheet finishing and communication of image data.

However, in the case of a job for finishing a plurality of sheets, there is sometimes an occasion wherein conflict between communication relating to sheet finishing and communication of image data is caused, and operations of the control system are disturbed accordingly.

For example, when image data are transmitted after ejection of the first sheet, and then, the second sheet is sent from image forming apparatus 100 to sheet finisher 200, it becomes impossible to transmit a notice of sheet feeding relating to the second sheet and an indication for sheet ejection, and the control system is suspended, because an amount of data for image data is large.

Figure 5:
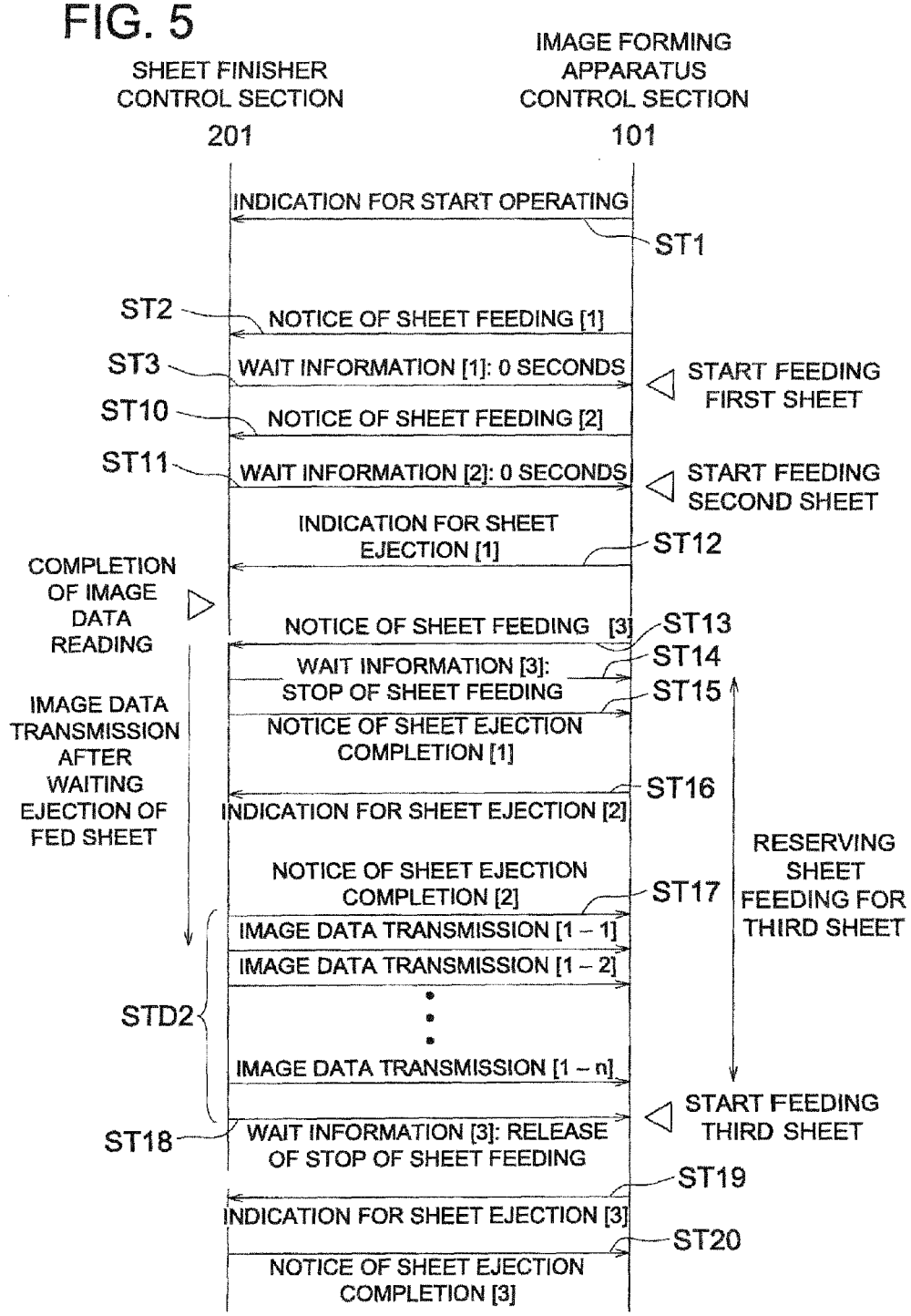
FIG. 5 is a ladder diagram for communication in the embodiment of the invention.

FIG. 5 shows an example of communication in an embodiment of the invention, which is free from the aforesaid disturbances. Incidentally, in step ST3, there is shown a period of time in a unit of a second like "wait information [1]: 0 second", for example, and this period of time shows wait time. Therefore, "wait information [1]: 0 second" indicates wait information whose content means "wait information relating to the fust sheet, and wait for 0 second for sheet feeding".

Steps from step ST1 to ST3 in FIG. 5 are the same as those in each of FIG. 3 and FIG. 4.

In step ST10 following the step ST3, sheet feeding for the second sheet is notified to sheet finisher control section 201 from image forming apparatus control section 101.

In step ST11, wait information relating to the second sheet is notified. In the illustrated example, when image forming apparatus control section 101 receives wait information notice, it causes sheet feeding section 130 immediately to operate to carry out sheet feeding, because wait time is 0 (ST11).

In step ST12, indication for sheet ejection for the first sheet is notified. The indication for sheet ejection is carried out based on a sheet detection signal of a sheet sensor (not shown) provided on a sheet ejection section of image forming apparatus 100. Therefore, the sheet is fed in sheet finisher 200 from image forming apparatus 100, immediately after the indication for sheet ejection in step ST12.

Image reading is carried out after stage ST12 when the first sheet was fed in sheet finisher 200. In the illustrated example, image reading is completed before the indication for sheet feeding.

Though the indication for sheet feeding for the third sheet is carried out in ST13, image reading is completed and image data to be transmitted are ready in the stage of ST13 when the indication for sheet feeding was carried out as stated above.

In step ST14, sheet finisher control section 201 notifies wait information whose content is to stop feeding for the third sheet. Following this request, image forming apparatus control section 101 causes sheet feeding section 130 to stop for suspending sheet feeding, and stops conveying a sheet to sheet finisher 200.

In step ST15, the sheet finisher control section 201 notifies completion of sheet ejection for the first sheet.

The image forming apparatus control section 101 transmits an indication of sheet ejection for the second sheet (ST16), and the sheet finisher control section 201 receives the second sheet, then, conveys and ejects it, and notifies completion of sheet ejection for the second sheet (ST17).

After notifying completion of sheet ejection for the second sheet, the sheet finisher control section 201 transmits image data acquired through image reading to image forming apparatus control section 101, by dividing them into 1-1, 1-2, . . . 1-n, in step STD2.

In step ST18 representing a stage when transmission of image data has been terminated, the sheet finisher control section 201 transmits releasing stop of sheet feeding as wait information, and image forming apparatus 100 that has received the releasing of stop releases the stop to cause sheet feeding section 130 to operate to start sheet feeding for the third sheet.

Indication for sheet ejection is carried out in step ST19, and notice for completion of sheet ejection is carried out respectively.

When image data to be transmitted from a sheet finisher are in existence, in the case of indication of sheet feeding by image forming apparatus control section 101, in step ST13, sheet finisher control section 201 requests suspension of sheet feeding, in step ST14. Due to this, the image forming apparatus control section 101 reserves sheet feeding for the third sheet until completion of transmission of image data, thus, conveyance of sheets from image forming apparatus 100 to sheet finisher 200 is suspended.

Then, sheet feeding for the third sheet is carried out at a stage when transmission of image data is completed. Further, in FIG. 5, transmission of image data is not carried out in spite of completion of image reading, while a sheet is existent in sheet finisher 200, as is shown in "transmitting image data after the fed sheet has been ejected", therefore, sheet conveyance is carried out by conveyance section 246, and image data are transmitted after completion of sheet ejection (completion of sheet ejection for the second sheet in step ST17).

Owing to the control of this kind, conflict between control communication and image data communication is avoided, and the system functions normally.

Meanwhile, in the example shown in FIG. 5, sheet finisher control section 201 transmits releasing stop of sheet feeding as wait information in step ST18, and image forming apparatus control section 101 resumes sheet feeding following the wait information. However, it is also possible to construct so that the image forming apparatus control section 101 may release the stop of sheet feeding at its own discretion, to resume sheet feeding. Namely, it is also possible to employ the construction in which the image forming apparatus control section 101 releases the stop of sheet feeding to resume sheet feeding, based on a termination of reception of image data at the stage of termination of reception for image data.

Figure 6:
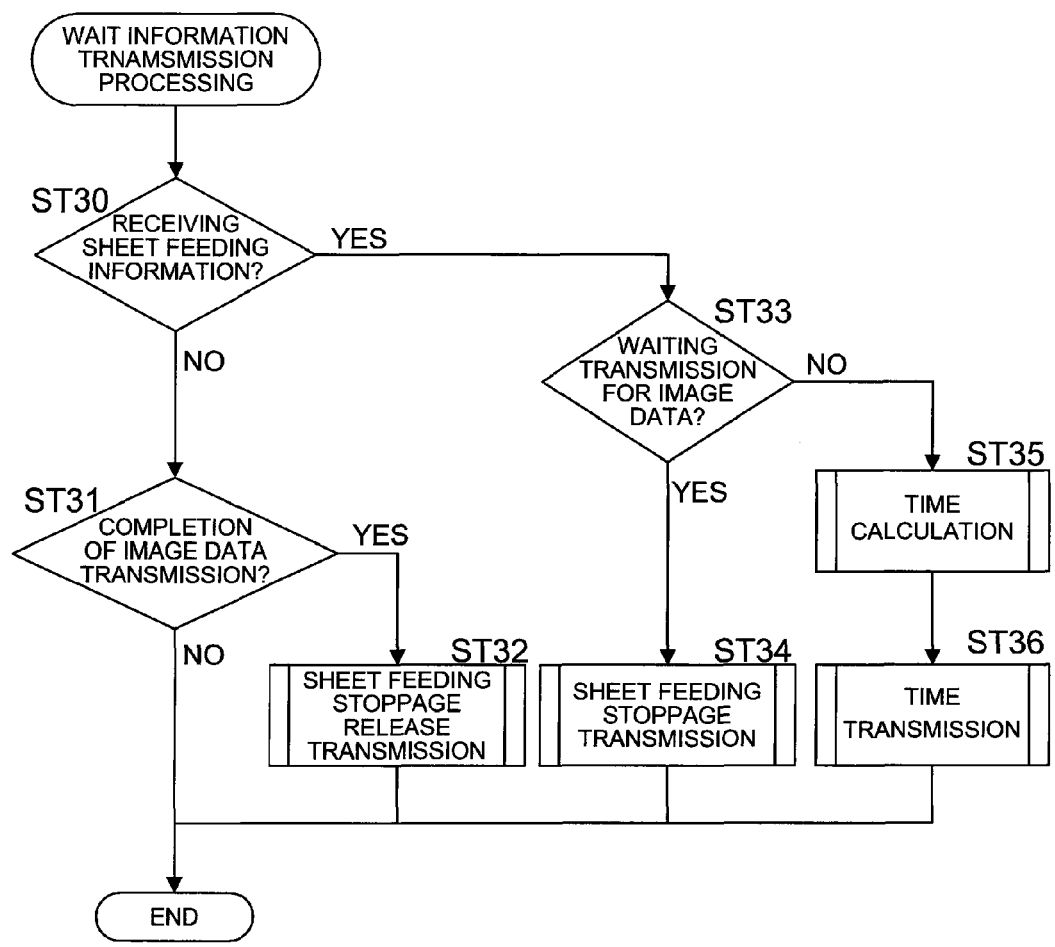
FIG. 6 is a flow chart showing processing wherein sheet finisher control section 201 generates wait information.

FIG. 6 is a flow chart showing the processing wherein sheet finisher control section 201 generates wait information in step ST3, ST11 and ST14 in FIG. 5.

When there is a notice of sheet feeding from image forming apparatus control section 101 (YES in ST30), the situation is checked whether it is in standing by for transmission of image data or not, in step ST33. If the situation is in standing by (YES in ST33), information of stop of sheet feeding is transmitted as wait information. Namely, ST14 in FIG. 5 is practiced (ST34). If the situation is not in standing by (NO in ST33), wait time is calculated, and the calculated wait time is transmitted as wait time (ST35 and ST36). ST36 corresponds to ST3 and T11 in FIG. 5.

When there is no notice of sheet feeding (NO in ST30), completion of transmission of image data is checked in step ST31, and if it is not completed, the transmission is terminated, while, when it is completed, a release of stop sheet feeding is transmitted as wait information (ST32). The step ST32 corresponds to ST18 in FIG. 5.

Figure 7:
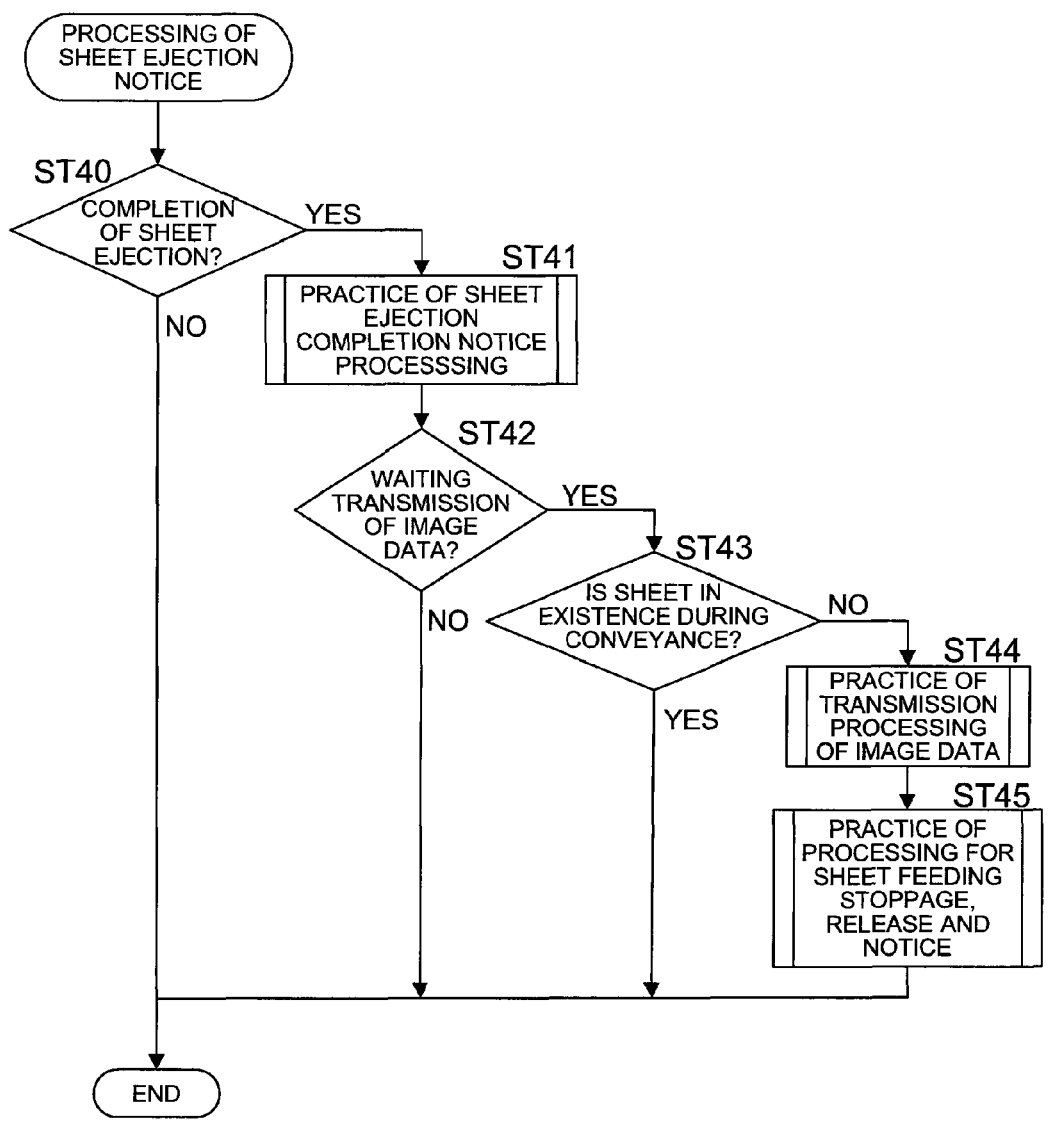
FIG. 7 is a flow chart of processing that is conducted by sheet finisher control section 201 in relation to a notice of sheet ejection completion.

FIG. 7 is a flow chart of processing that is conducted by sheet finisher control section 201 in relation to a notice of sheet ejection completion in each of ST15, ST17 and ST20 in FIG. 5.

In step ST40, a judgment is formed whether the state is to conduct processing of sheet ejection completion or not. A criterion in the judgment in ST40 is related to whether the sheet ejection of the sheet for the indication of sheet ejection has been completed or not, after a receipt of a message of the indication of sheet ejection from image forming apparatus control section 101 (ST12, ST16 and ST19 in FIG. 5), and for example, sheet ejection completion is judged based on detection signals of a sheet ejection sensor (not shown) provided on a sheet ejection section of sheet finisher 200.

When sheet ejection is not completed yet (NO in ST40), a situation is caused to come to an end. When the sheet ejection has been completed (YES in ST40), sheet ejection completion is notified to image forming apparatus control section 101 in step ST41. In step ST42 after the sheet ejection completion is notified, the situation is checked whether it is in standing by for transmission of image data or not. If the situation is not in standing by for transmission of image data (NO in ST42), it is caused to come to an end, while, when the situation is in standing by for transmission of image data (YES in ST42), it is checked as to whether a sheet exists in the conveyance section or not in step ST43. In the case of existence of the sheet (YES in ST43), sheet ejection for the sheet is given priority to be terminated, without conducting transmission of image data. An occasion of existence of a sheet in step ST43 corresponds to "transmission of image data after waiting sheet ejection for the sheet that has been fed", in FIG. 5. In the case of absence of the sheet (NO in ST43), transmission of image data is carried out (ST44), and release of sheet feeding stop following the transmission of image data is notified (ST45). The step ST45 corresponds to ST18 in FIG. 5.

Figure 8:
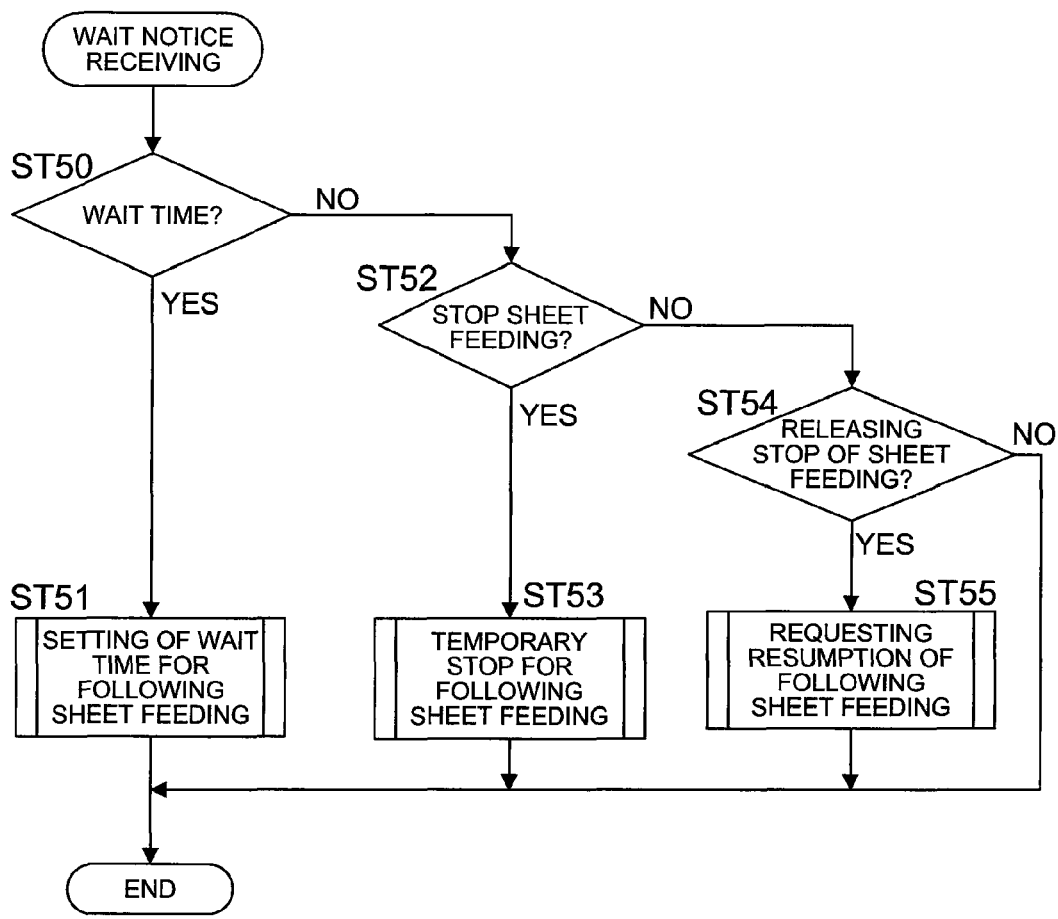
FIG. 8 is a flow chart of processing in the case where image forming apparatus control section 101 has received wait information from sheet finisher control section 201.

FIG. 8 is a flow chart of processing in the case where image forming apparatus control section 101 has received wait information from sheet finisher control section 201.

When wait information is received, the wait information is judged whether it is wait time or not.

When the wait information is wait time (YES in ST50), wait time up to the following sheet feeding is established (ST51). When the wait information is not wait time (NO in ST50), the wait information is judged whether it is stop sheet feeding or not, in step ST52. When the wait information is the stop sheet feeding (YES in ST52), succeeding sheet feeding is stopped (ST53). Namely, the following sheet is not fed. When the wait information is not the stop sheet feeding (NO in ST52), the wait information is judged whether it is releasing stop of sheet feeding or not, in step ST54. When the wait information is releasing stop of sheet feeding (YES in ST54), sheet feeding for the succeeding sheet is carried out (ST55). Step ST 55 corresponds to ST18 in FIG. 5.

In the embodiment explained above, sheet finisher control section 201 judges whether sheet feeding in image forming apparatus 100 should be stopped or not, and notifies "stop sheet feeding" and "releasing stop of sheet feeding" to image forming apparatus control section 101.

However, it is also possible to employ the structure in which the aforesaid judgment is formed by image forming apparatus control section 101.

The sheet finisher control section 201 notifies that reading by image reading section 210 has been completed to the image forming apparatus control section 101. The image forming apparatus control section 101 that has received a notice of completion of reading stops temporarily the sheet feeding for the succeeding sheet. The image forming apparatus control section 101.stops sheet feeding temporarily, and requests sheet finisher control section 201 to transmit image data, and receives image data.

At the stage of completion of reception for image data, the image forming apparatus control section 101 resumes sheet feeding which has been suspended.

In the invention, as explained above, when image reading is carried out, and image data acquired by the image reading are transmitted to the image forming apparatus, in sheet finisher 200, image data are transmitted after sheet conveyance from the image forming apparatus to the sheet finisher is stopped. Then, sheet conveyance is resumed after transmission of image data. Owing to this, communication of image data and communication of control data are carried out normally, even when an amount of image data is large.

The image forming apparatus control section 101 and the sheet finisher control section 201 cause the system to operate normally while achieving the aforesaid functions, as control devices for the whole of an image forming system.

In an image forming system wherein plural sheet finishers are connected to an image forming apparatus, an image reading section is provided on a sheet finisher (hereinafter referred to as sheet finisher A) that is connected to the image forming apparatus as a standard equipment. In the image forming system of this kind, there is sometimes an occasion wherein another sheet finisher (hereinafter referred to as sheet finisher B) is connected to the rear step that is at the downstream side of the sheet finisher in the direction of sheet conveyance direction. Then, there is an occasion where request of communication is transmitted from sheet finisher B to the image forming apparatus in the course of transmitting image data from sheet finisher A. In the occasion of this kind, the control device gives priority to communication with sheet finisher B. Namely, the control device discontinues communication of image data, to conduct communication with sheet finisher B, and resumes communication of image data after waiting termination of the communication with the sheet finisher B.

The processing of discontinuation and the processing of resumption in this case can also be carried out either by the sheet finisher control section or by the image forming apparatus control section.

What is claimed is:

1. A sheet finisher comprising:
    a conveyance section which conveys a sheet;
    an image reading section which reads an image on a sheet which is conveyed to the sheet finisher from an image forming apparatus which forms the image on the sheet; and
    a sheet finisher control section which transmits wait information to the image forming apparatus to request an interruption of sheet conveyance from the image forming apparatus to the sheet finisher, and, after transmitting the wait information, transmits to the image forming apparatus image data acquired by the image reading section by reading the image formed on the sheet.

2. The sheet finisher of claim 1, wherein the sheet finisher control section transmits the image data after confirming that there is no paper in the conveyance section.

3. The sheet finisher of claim 1, wherein the wait information includes a wait time which represents a period of the interruption of sheet conveyance from the image forming apparatus.

4. The sheet finisher of claim 1, wherein, after completing transmitting the image data, the sheet finisher control section transmits further wait information to the image forming apparatus which releases the interruption of sheet conveyance.

5. An image forming apparatus comprising:

an image forming section which forms an image on a sheet;

a sheet feeding section which feeds the sheet to the image forming section; and an image forming apparatus control section, wherein, when the image forming apparatus control section receives image data from a sheet finisher to which the sheet having the image formed thereon is conveyed from the image forming apparatus, the sheet finisher reading the image formed on the sheet to acquire the image data, the image forming apparatus control section first interrupts sheet feeding by the sheet feeding section before receiving the image data, then receives the image data from the sheet finisher, and then restarts the sheet feeding by activating the sheet feeding section after completing the reception of the image data.

6. The image forming apparatus of claim 5, wherein the sheet finisher reads an image of a test pattern formed on the sheet conveyed from the image forming apparatus and acquires the image data, and the image forming apparatus conducts an image quality adjustment for forming an image based on the image data transmitted to the image forming apparatus from the sheet finisher.

7. An image forming system comprising:

an image forming apparatus including (i) an image forming section which forms image on a sheet, and (ii) a sheet feeding section which feeds the sheet to the image forming section; and a sheet finisher including (i) a conveyance section which conveys the sheet, and (ii) an image reading section which reads the image formed on the sheet conveyed to the sheet finisher from the image forming apparatus, to acquire image data; and a control section, wherein, when the control section transmits, from the sheet finisher to the image forming apparatus, the image data acquired by the image reading section of the sheet finisher, the control section first interrupts conveying a sheet from the image forming apparatus to the sheet finisher before transmitting the image data, then transmits the image data to the image forming apparatus after interrupting conveying the sheet, and then restarts conveying the sheet from the image forming apparatus to the sheet finisher after completing transmitting the image data.

8. The image forming system of claim 7, wherein the control section includes an image forming apparatus control section provided at the image forming apparatus and a sheet finisher control section provided at the sheet finisher.

9. The image forming system of claim 8, wherein the sheet finisher control section performs a judgment of interrupting conveying the sheet from the image forming apparatus to the sheet finisher and a judgment of restarting conveying the sheet from the image forming apparatus to the sheet finisher after completing transmitting the image data.

10. The image forming system of claim 8, wherein the image forming apparatus control section performs a judgment to interrupt conveying the sheet from the image forming apparatus to the sheet finisher and a judgment to restart conveying the sheet from the image forming apparatus to the sheet finisher after transmitting the image data is completed.

11. The image forming system of claim 7, further comprising one or more of other sheet finishers connected to the sheet finisher at a down stream side thereof;

wherein, when the control section receives a request of communication from the one or more of other sheet finishers while transmitting the image data, the control section interrupts the transmitting the image data, then performs a communication from the one or more of other sheet finishers, and then restarts transmitting the image data after completing the communication.

12. The sheet finisher of claim 1, wherein the image reading section reads an image of a test pattern formed on the sheet conveyed from the image forming apparatus and acquires the image data, and the image forming apparatus conducts an image quality adjustment for forming an image based on the image data transmitted to the image forming apparatus from the sheet finisher.

13. The image forming system of claim 7, wherein the image reading section reads an image of a test pattern formed on the sheet conveyed from the image forming apparatus and acquires the image data, and the image forming apparatus conducts an image quality adjustment for forming an image based on the image data transmitted to the image forming apparatus from the sheet finisher.

* * * * *